Patented June 24, 1930

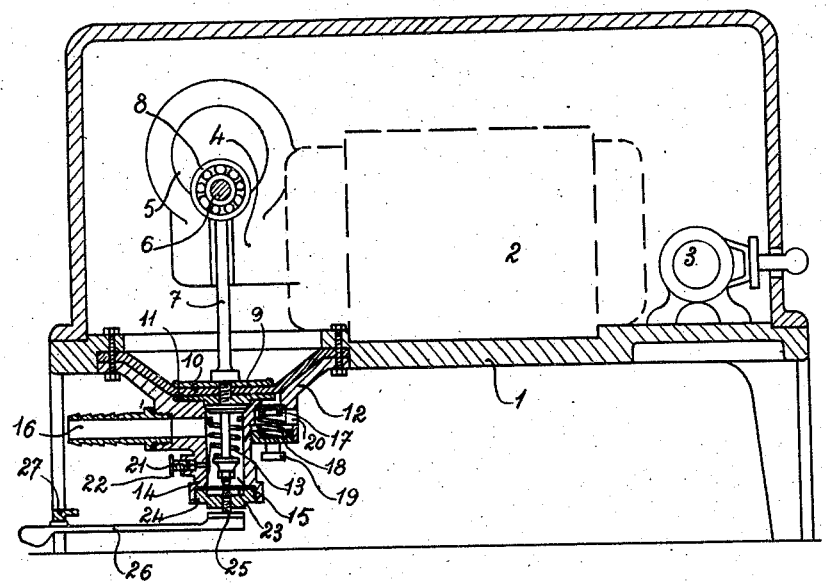
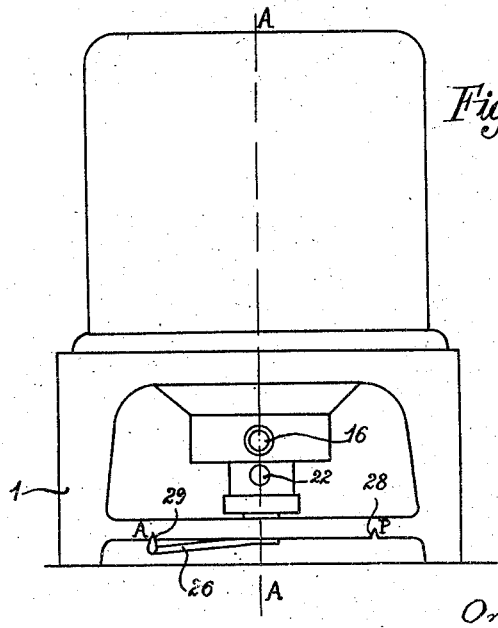

1,767,320

UNITED STATES PATENT OFFICE

ORESTE SINANIDE, OF LONDON, ENGLAND

VACUUM MEDICAL APPARATUS

Application filed February 7, 1928, Serial No. 252,569, and in France December 1, 1927.

This invention relates to vacuum pumps and it has for its object a vacuum apparatus adapted to create at will a continuous vacuum or, on the contrary, a series of pulsations in the same piping system connected to various utilization apparatus for medical treatment.

According to this invention, the apparatus is constituted by an air pump, preferably of the diaphragm type, provided with devices permitting it to be transformed at will into a pulsating device by the simple operation of a lever, without the necessity of fixing on or taking off any part. The invention also concerns several details of construction which are directed to a greater efficiency and convenience in working the said pump and which will be best understood by the detailed description given hereafter with reference to the appended drawing, in which:

Fig. 1 is a front view of the apparatus, and

Fig. 2 is a vertical cross-section on line A—A of Fig. 1.

The apparatus consists of a base 1 supporting an electric motor 2 started by a switch 3 of any suitable description. To the motor 2 is connected a reducing gearing 4, of the worm type, of well-known construction and requiring therefore no further description. This gearing drives a crank disc 5 provided with a pin 6 on which is mounted, by means of a ball bearing 8, the connecting rod 7.

The lower end of the connecting rod 7 is provided with a circular disc 9 on which is tightly clamped a flexible diaphragm 10 (for instance, of indiarubber), by means of the counter-disc 11. The diaphragm 10 fits in a conical cup 12, and it is clamped at the edge in an air-tight manner between the edge of the cup 12 and the edge of an opening provided in the base 1 for the free passage of the connecting rod 7 and of the clamping disc 9—11.

At the bottom of the cup 12, and placed concentrically, is situated a suction valve 13, closed by a spring 14, and housed in a cylindrical casing 15 into which opens the suction tube 16.

On one side of the seat of the valve 13 is situated the delivery valve 17, pressed by a spring 18 adjustable by a screw 19. The air forced out by the motion of the diaphragm escapes through the orifice 20.

The casing 15 is also provided with an outlet orifice 21 which can be closed to a variable extent by the operation of a split screw 22.

Finally, the bottom of this casing 15 is closed by an extensible diaphragm 23, clamped by a plug 24 in which is adapted to be screwed an adjusting screw 25 the function of which will be explained hereafter. This screw 25 is operated by hand by means of a lever 26 adapted to move under a bridging piece 27 connecting the two front legs of the base 1. This bridging piece may be provided with regulating notches 28, 29 in which the lever 26 enters owing to its springiness.

The operation is as follows:

The crank 5 is driven by the motor 2 and rotates, lifting and lowering alternately the diaphragm 10. The connecting rod 7 being relatively long, its obliquity is not objectionable, so that there is no need to provide a joint between the disc 9 and the lower portion of the connecting rod. In this manner a series of pulsations are produced in the conical cup 12 and, if the valve 13 is free to seat itself the apparatus creates a vacuum in the pipe 16, a vacuum which can be adjusted by the operation of the screw 22.

By manipulating the lever 26, the screw 25 is rotated and lifts the diaphragm 23, thereby preventing the valve 13 from fitting on its seat. In these conditions the apparatus simply creates in the pipe 16 a series of pulsations with reduced pressure.

By bringing back the lever 26 to its first position, the pump is again caused to work as a vacuum pump, the diaphragm 23 allowing the valve 13 to work freely. The two notches 28 and 29 of the bridging piece 27 correspond to these two modes of working.

I claim:

1. A vacuum apparatus for medical treatment, comprising an air pump, a vacuum chamber related thereto and provided with an inlet and a valve-controlled outlet and having at its bottom a plug and a flexible diaphragm above the same to form an air-tight joint, a normally-closed suction valve in said chamber above said diaphragm to control communication between the chamber and its outlet, and an endwise-movable member mounted in said plug in line with the suction valve to lift said diaphragm and thereby raise said valve into open position.

2. A vacuum apparatus for medical treatment, comprising an air pump embodying a cup, a flexible diaphragm mounted therein, and a reciprocating piston connected to the diaphragm; a suction chamber connected to said cup and provided with an inlet and a valve-controlled outlet and having at its bottom a plug and a flexible diaphragm above the same to form an air-tight joint; a normally-closed suction valve in said chamber above the last-named diaphragm to control communication between the chamber and its outlet; and an endwise-movable member mounted in said plug in line with the suction valve to lift said last-named diaphragm and thereby raise said valve into open position.

In testimony whereof I affix my signature.

ORESTE SINANIDE.